United States Patent
Genthner et al.

(10) Patent No.: US 8,553,702 B2
(45) Date of Patent: Oct. 8, 2013

(54) METHODS AND SYSTEMS FOR AUTOMATIC CARVING AND POLICY ENFORCEMENT FOR OPTICAL TRANSPORT NETWORK HIERARCHY

(75) Inventors: Frederick Nick Genthner, Atlanta, GA (US); Satish Gopalakrishna, Alpharetta, GA (US); Kelai Shi, Johns Creek, GA (US)

(73) Assignee: Ciena Corporation, Hanover, MD (US)

( * ) Notice: Subject to any disclaimer, the term of this patent is extended or adjusted under 35 U.S.C. 154(b) by 236 days.

(21) Appl. No.: 13/110,095

(22) Filed: May 18, 2011

(65) Prior Publication Data

US 2012/0294610 A1 Nov. 22, 2012

(51) Int. Cl.
*H04L 12/28* (2006.01)

(52) U.S. Cl.
USPC ............... 370/395.21; 370/395.2; 370/465; 398/57

(58) Field of Classification Search
USPC ............ 370/229, 235, 907, 458, 423, 428, 370/471, 481, 395.21, 395.2; 398/229, 235, 398/907
See application file for complete search history.

(56) References Cited

U.S. PATENT DOCUMENTS

| | | | | |
|---|---|---|---|---|
| 2012/0051745 A1* | 3/2012 | Srinivasan et al. | ............ | 398/58 |
| 2012/0082455 A1* | 4/2012 | Bardalai et al. | ............ | 398/58 |

\* cited by examiner

*Primary Examiner* — Dady Chery

(74) *Attorney, Agent, or Firm* — Clements Bernard PLLC; Christopher L. Bernard; Lawrence A. Baratta, Jr.

(57) ABSTRACT

The present disclosure provides methods and systems for automatic carving of Optical channel Data Unit k (ODUk) levels on connection creation as well as the enforcement of an OTN hierarchy policy. In an exemplary embodiment, the present invention provides several methods of automatically carving Optical channel Data Tributary Unit Group (ODTUG) structures down to a desired ODUk layer during end-to-end circuit setup. These methods may include a recursively descending algorithm, an iterative array algorithm, and an ordered linked list algorithm. Additionally, to interoperate with network elements which may have a fixed ODTUG structure within an Optical channel Transport Unit (OTU), a method of policy enforcement describing each ODUk layer mapped into ODTUG structures is used to select a best match of the currently provisioned ODUk layers.

17 Claims, 7 Drawing Sheets

| INDEX | 0 | 1 | 2 | 3 | 4 | 5 | 6 | 7 |
|---|---|---|---|---|---|---|---|---|
| ODU2 | ODU2 ID1 | ODU2 ID1 | ODU2 ID1 | ODU2 ID1 | ODU2 ID1 | ODU2 ID1 | ODU2 ID1 | ODU2 ID1 |
| ODU1 | ODU1 ID1 | ODU1 ID1 | ODU1 ID2 | ODU1 ID2 | N/A | N/A | ODU1 ID4 | ODU1 ID4 |
| Max provisionable | ODU0 | ODU0 | UNAVAIL | UNAVAIL | ODU1 | ODU1 | ODU0 | ODU0 |
| Available bandwidth | 0/0/2 | 0/0/2 | 0/0/0 | 0/0/0 | 0/1/2 | 0/1/2 | 0/0/2 | 0/0/2 |

METHODS AND SYSTEMS FOR AUTOMATIC CARVING AND POLICY ENFORCEMENT FOR OPTICAL TRANSPORT NETWORK HIERARCHY

FIELD OF THE INVENTION

The present invention relates generally to optical networking methods and systems. Particularly, the present invention provides systems and methods for automatic carving of Optical channel Data Unit (ODUk) levels on connection creation as well as the enforcement of an Optical Transport Network (OTN) hierarchy policy.

BACKGROUND OF THE INVENTION

Optical Transport Network (OTN) generally relates to protocols providing an efficient and globally-acceptable way to multiplex services onto optical light paths. Advantageously, OTN is fully-transparent for underlying multiplexed signals and offers rich management features. For example, OTN is defined in part by International Telecommunication Union Telecommunication (ITU-T) Recommendation G.709/Y.1331 "Interfaces for the Optical Transport Network (OTN)" (December 2009), the contents of which are herein incorporated by reference. Generally, client signals are mapped into Optical channel Payload Units (OPU) which may be mapped into an Optical channel Data Unit (ODU) at k layers with bit rates defined for each k layer (k currently defined for 0, 1, 2, 2e, 3, 4 and flex). An ODUk may be mapped or multiplexed into an Optical channel Data Tributary Unit Group (ODTUG) of an associated or higher order layer which in turn may be mapped or multiplexed into an Optical channel Transport Unit (OTU) of an associated or higher order layer. In particular, Section 7 in G.709 details multiplexing and mapping of various data rates. Any number of levels and layers of ODUk mapping and multiplexing may theoretically occur given extensions of the standardized k layers. Currently defined k layers are 0, 1, 2, 2e, 3, 4 and flex, and future versions may be defined via 5, 6, etc.

The present state of ODUk and ODTUG mapping and multiplexing is either a fixed or manually provisioned structure. For example, a network element receiving ODU0 signals multiplexed in an ODU2 would have a fixed ODTUG02 which is then multiplexed with other ODTUG02 signals into an ODTUG23 and mapped into an OTU3. A network element receiving this signal would need to either support the same fixed ODTUG structure or support manual provisioning of arbitrary levels which could then be provisioned with identical ODTUG mapping. Provisioning end-to-end connections across network clouds then becomes an exercise in the micro-management of the ODTUG structures at each intermediate link, depending on what mapping and multiplexing that particular network element supports. Available bandwidth within this structuring could exist at any associated or lower order ODUk level and must be manually located and provisioned as well. Another shortcoming with the conventional approach is that the network user needs to predetermine where and how their OTN traffic will be setup as well as how and where it is restored. If this is not done properly, it gives rise to bandwidth fragmentation and hence bandwidth is not used the best way it should be used. Further, interoperation between vendors is a problematic and many times not even possible due to the ODTUG structure.

BRIEF SUMMARY OF THE INVENTION

In an exemplary embodiment, a method includes receiving a connection request for Optical Transport Network (OTN) bandwidth at a network element; and iteratively utilizing a data structure stored in data store to automatically carve a smallest available bandwidth in terms of Optical channel Data Unit level k (ODUk) for the connection request thereby minimizing bandwidth fragmentation. The method further includes enforcing an OTN hierarchy policy on the connection request to select the smallest available bandwidth. Optionally, the data structure includes a parent/child relationship tree starting with an Optical channel Transport Unit (OTU) and continuing through each Optical channel Data Unit level k (ODUk) layer for each OTU at the network element. The method may further include implementing a recursively descending algorithm on the parent/child relationship tree to automatically carve the smallest available bandwidth. Alternatively, the data structure includes an array of each ODUk level at the smallest granularity of Optical channel Data Unit level 0 (ODU0). The method may further include iterating through the array to automatically carve the smallest available bandwidth. Additionally, the data structure may include a linked list in which each element in the linked list represents a single ODUk provisioned underneath an OTU. The method may further include traversing the linked list to automatically carve the smallest available bandwidth. The method may further include utilizing the data structure to advertise available bandwidth via a control plane. The method may further include updating the data structure based on bandwidth changes at the network element. The OTN hierarchy policy enforces a fixed Optical channel Data Tributary Unit Group (ODTUG) structure.

In another exemplary embodiment, an optical network element includes a plurality of ports configured to switch therebetween using an Optical Transport Network (OTN) hierarchy; a data store configured to store data defining bandwidth and policy for each of the plurality of ports; and a processor communicatively coupled to the data store and configured to automatically carve bandwidth based on an iterative analysis of the data thereby minimizing bandwidth fragmentation. Optionally, the data includes a parent/child relationship tree starting with an Optical channel Transport Unit (OTU) and continuing through each Optical channel Data Unit level k (ODUk) layer for each OTU at the network element. The processor may be configured to: implement a recursively descending algorithm on the parent/child relationship tree to automatically carve the smallest available bandwidth supportive of the policy. Alternatively, the data includes an array of each ODUk level at the smallest granularity of Optical channel Data Unit level 0 (ODU0). The processor may be configured to: iterate through the array to automatically carve the smallest available bandwidth supportive of the policy. Additionally, the data may include a linked list in which each element in the linked list represents a single ODUk provisioned underneath an OTU. The processor may be configured to: traverse the linked list to automatically carve the smallest available bandwidth.

In yet another exemplary embodiment, a control module includes an interface communicatively coupled to a plurality of ports using an Optical Transport Network (OTN) hierarchy; a data store communicatively coupled to the interface; and circuitry communicatively coupled to the data store and the interface, wherein the circuitry is configured to: implement a control plane; and upon request for a new connection, automatically carve the connection based on a iteratively analyzing a data structure stored in the data store such that bandwidth fragmentation is minimized an a defined policy is complied therewith. The circuitry is configured to operate any of Automatically Switched Optical Network (ASON), Automatic Switched Transport Network (ASTN), Generalized Multiprotocol Label Switching (GMPLS), or Optical Signaling and Routing Protocol (OSRP).

BRIEF DESCRIPTION OF THE DRAWINGS

The present invention is illustrated and described herein with reference to the various drawings of exemplary embodiments, in which like reference numbers denote like method steps and/or system components, respectively, and in which:

FIG. 5 is an exemplary array used in an iterative array algorithm for storing each ODUk level at the smallest granularity of ODU0 for use in an exemplary embodiment of the operational method of FIG. 3;

DETAILED DESCRIPTION OF THE INVENTION

In various exemplary embodiments, the present invention provides methods and systems for automatic carving of ODUk levels on connection creation as well as the enforcement of an OTN hierarchy policy. In an exemplary embodiment, the present invention provides several methods of automatically carving Optical channel Data Tributary Unit Group (ODTUG) structures down to a desired ODUk layer during end-to-end circuit setup. These methods may include a recursively descending algorithm, an iterative array algorithm, and an ordered linked list algorithm. Additionally, to interoperate with network elements which may have a fixed ODTUG structure within an Optical channel Transport Unit (OTU), a method of policy enforcement describing each ODUk layer mapped into ODTUG structures is used to select a best match of the currently provisioned ODUk layers or to ensure that a selected ODUk matches per policy. The best match selection of the ODUk layer may be the one with the smallest available bandwidth that will fit the circuit being provisioned while at the same time matching the ODTUG structure policy. If the best match ODUk layer selected is not the lowest ODUk layer specified by the ODTUG structure but can support it, it may automatically provision the lower ODUk layers as specified by the ODTUG structure policy. The selection of the smallest available bandwidth supporting the circuit being provisioned maintains optimal bandwidth fragmentation. The foregoing may be implemented as a method, through an optical network element, and/or via a processor configured to control a network element.

Advantageously, the present invention provides optimal bandwidth usage without fragmentation in the OTN multiplexing hierarchy with no internal or external fragmentation present. The flexible auto carve scheme described herein may be configured at every port or globally by default which may be applied to all circuits that go over a port or even at a lower level of ODU-j/k TTP (Trail Termination Point). Further, the present invention enables interoperability between different vendors irrespective of their capabilities and the negotiation to the Link Connection Monitoring (LCM) capabilities (e.g., whether the vendor has manual scheme or auto scheme does not matter). The present invention provides an optimized algorithm considering the time and space complexities required to solve this problem. The present invention also provides a very flexible way of mixing and matching different payload types (PT), both PT=21 and PT=20, managing all the tributary port numbers, their validations, and their constraints along with the mix and match of the payload types, and making the auto detection and auto carve of the detected scheme on any OTU port extremely easy and flexible.

Figure 1:
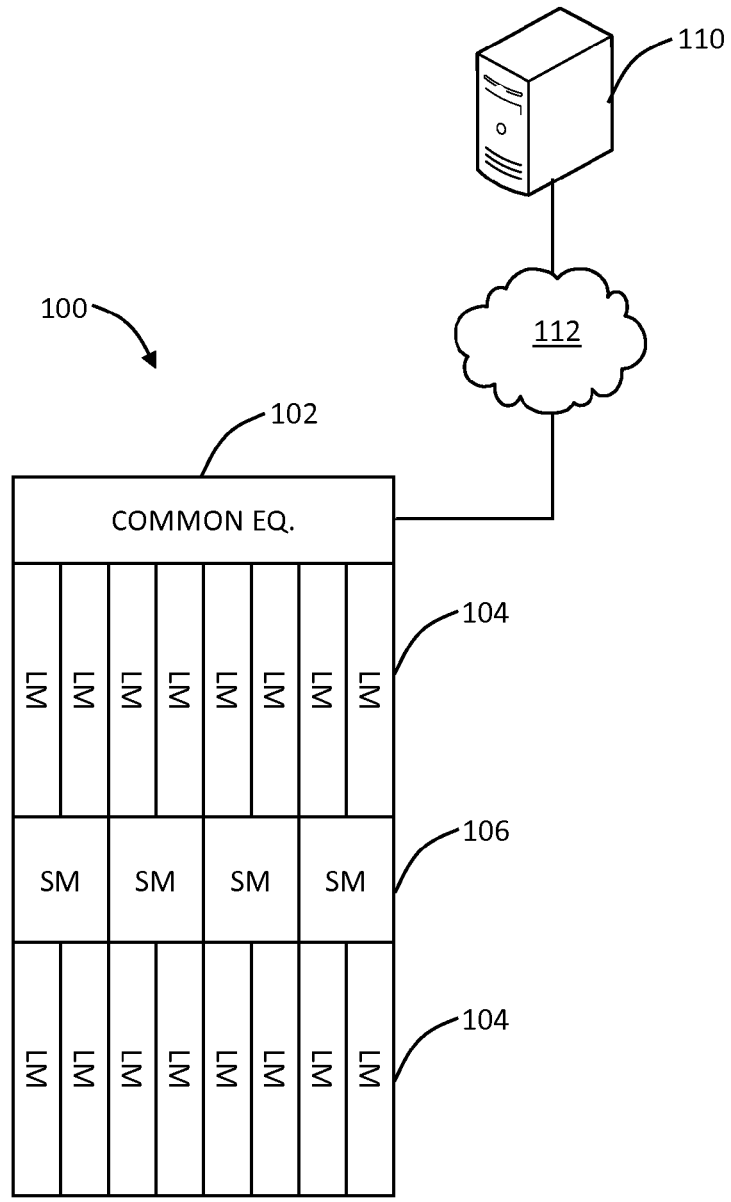
FIG. 1 is a block diagram of an exemplary optical network element configured for automatic carving of ODUk levels and enforcement of an OTN hierarchy policy.

Referring to FIG. 1, in an exemplary embodiment, an exemplary optical network element 100 configured for automatic carving of ODUk levels and enforcement of an OTN hierarchy policy is illustrated. In an exemplary embodiment, the optical network element 100 is a network element (NE) that may consolidate the functionality of a multi-service provisioning platform (MSPP), digital cross connect (DCS), Ethernet and Optical Transport Network (OTN) switch, dense wave division multiplexed (DWDM) platform, etc. into a single, high-capacity intelligent switching system providing layer 0, 1, and 2 consolidation. In another exemplary embodiment, the network element 100 may include a SONET add/drop multiplexer (ADM), an SDH ADM, an OTN ADM, a multi-service provisioning platform (MSPP), a digital cross-connect (DCS), etc. Generally, the optical network element 100 includes common equipment 102, line modules (LM) 104, and switch modules (SM) 106. The common equipment 102 may include power; a control module; operations, administration, maintenance, and provisioning (OAM&P) access; and the like. For example, the common equipment 102 may connect to a management system 110 through a data communication network 112. The management system 110 may include a network management system (NMS), element management system (EMS), or the like. Additionally, the common equipment 102 may include a control plane processor configured to operate a control plane and the systems and methods described herein. Exemplary control planes may include Automatically Switched Optical Network (ASON) (G.8080/Y.1304, etc.), Automatic Switched Transport Network (ASTN), Generalized Multiprotocol Label Switching (GMPLS), Optical Signaling and Routing Protocol (OSRP), and the like.

The line modules 104 may be communicatively coupled to the switch modules 106, such as through a backplane, midplane, or the like. The line modules 104 are configured to provide ingress and egress to the switch modules 106, and are configured to provide interfaces for the OTN services described herein. In an exemplary embodiment, the line modules 104 may form ingress and egress switches with the switch modules 106 as center stage switches for a three-stage switch, e.g. a three stage Clos switch. The line modules 104 may include optical transceivers, such as, for example, 2.5 Gb/s (OC-48/STM-1, OTU1, ODU1), 10 Gb/s (OC-192/STM-64, OTU2, ODU2), 40 Gb/s (OC-768/STM-256, OTU3, ODU3), etc. Further, the line modules 104 may include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s. The line modules 104 may include DWDM interfaces, short reach interfaces, and the like, and may connect to other line modules 104 on remote optical network elements 100, NEs, end clients, and the like. From a logical perspective, the line modules 104 provide ingress and egress ports to the optical network elements 100, and each line module 104 may include one or more physical ports.

The switch modules 106 are configured to switch services between the line modules 104. For example, the switch modules 106 may provide wavelength granularity (layer 0 switching), SONET/SDH granularity such as Synchronous Transport Signal-1 (STS-1), Synchronous Transport Module level 1 (STM-1), Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical channel Payload Virtual Containers (OPVCs), etc.; Ethernet granularity; Digital Signal n (DSn) granularity such as DS0, DS1, DS3, etc.; and the like. Specifically, the switch modules 106 may include both Time Division Multiplexed (TDM) and packet switching engines. The switch modules 106 may include redundancy as well, such as 1:1, 1:N, etc. Those of ordinary skill in the art will recognize the optical network element 100 may include other components which are omitted for simplicity, and that the systems and methods described herein are contemplated for use with a plurality of different network elements with the optical network element 100 presented as an exemplary type of network element. For example, in another exemplary embodiment, the optical network element 100 may not include the switch modules 106, but rather have the corresponding functionality in the line modules 104 in a distributed fashion. Other architectures are also contemplated for the optical network element 100.

Figure 2:
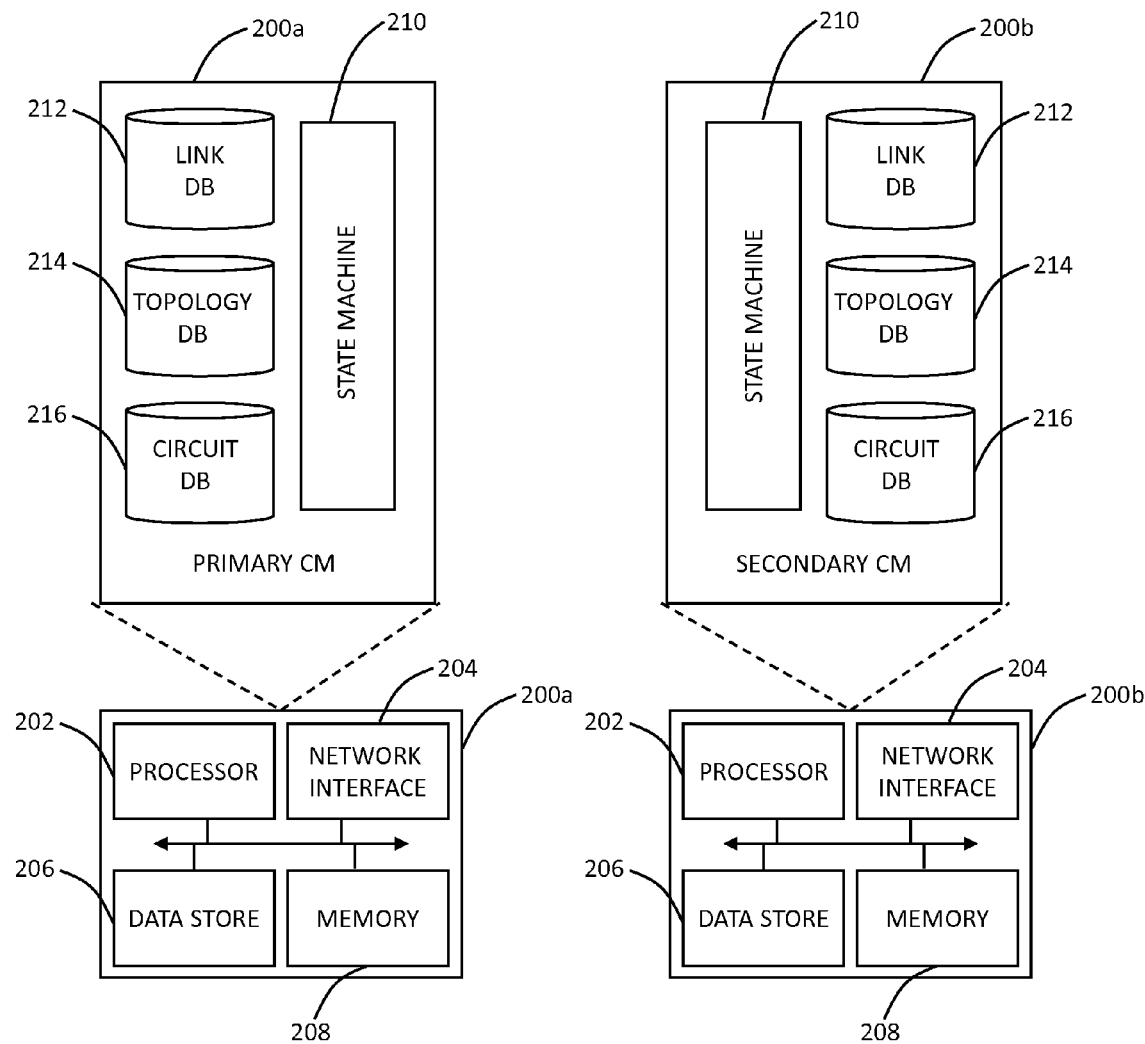
FIG. 2 is a block diagram of redundant control modules (CM) and associated functionality.

Referring to FIG. 2, in an exemplary embodiment, redundant control modules (CMs) 200a, 200b for the optical network element 100 are illustrated to provide control plane processing. For example, the control plane can include OSRP, ASON, GMPLS, and the like as described herein. The CMs 200a, 200b may be part of common equipment, such as common equipment 102 in the optical network element 100 of FIG. 1. The CMs 200a, 200b may include a processor 202 which is hardware device for executing software instructions such as operating the control plane. The processor 202 may be any custom made or commercially available processor, a central processing unit (CPU), an auxiliary processor among several processors associated with the CMs 200a, 200b, a semiconductor-based microprocessor (in the form of a microchip or chip set), or generally any device for executing software instructions. When the CM 200a, 200b is in operation, the processor 202 is configured to execute software stored within memory, to communicate data to and from the memory, and to generally control operations of the CM 200a, 200b pursuant to the software instructions.

The CMs 200a, 200b may also include a network interface 204, a data store 206, memory 208, and the like, all of which are communicatively coupled therebetween and with the processor 202. The network interface 205 may be used to enable the CMs 200a, 200b to communicate on a network, such as to communicate control plane information to other CMs or to the management system 110. The network interface 204 may include, for example, an Ethernet card (e.g., 10BaseT, Fast Ethernet, Gigabit Ethernet) or a wireless local area network (WLAN) card (e.g., 802.11a/b/g). The network interface 204 may include address, control, and/or data connections to enable appropriate communications on the network. The data store 206 may be used to store data, such as control plane information received from network elements 100 or other CMs, provisioning data, OAM&P data, etc. The data store 206 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 206 may incorporate electronic, magnetic, optical, and/or other types of storage media. The memory 208 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 208 may incorporate electronic, magnetic, optical, and/or other types of storage media. Note that the memory 208 may have a distributed architecture, where various components are situated remotely from one another, but may be accessed by the processor 202.

From a logical perspective, each of the CMs 200a, 200b may include a state machine 210, a link database (DB) 212, a topology DB 214, and a circuit DB 216. The CMs 200a, 200b are responsible for all control plane processing. Generally, a control plane includes software, processes, algorithms, etc. that control configurable features of a network, such as automating discovery of network elements, capacity on the links, port availability on the network elements, connectivity between ports; dissemination of topology and bandwidth information between the network elements; calculation and creation of paths for connections; network level protection and restoration; and the like. In an exemplary embodiment, the control plane may utilize Automatically Switched Optical Network (ASON) as defined in G.8080/Y.1304, Architecture for the automatically switched optical network (ASON) (February 2005) and the like. In another exemplary embodiment, the control plane may utilize Generalized Multi-Protocol Label Switching (GMPLS) Architecture as defined in Request for Comments: 3945 (October 2004) and the like. In yet another exemplary embodiment, the control plane may utilize Optical Signaling and Routing Protocol (OSRP) from Ciena Corporation of Linthicum, Md. which is an optical routing protocol similar to PNNI (Private Network-to-Network Interface) and MPLS (Multiprotocol Label Switching). Those of ordinary skill in the art will recognize the network and the control plane may utilize any type control plane for controlling the network elements and establishing connections therebetween. The control plane may be centralized, distributed, or a combination thereof.

The CMs 200a, 200b may be configured in a redundant 1+1, 1:1, etc. configuration. The state machine 210 is configured to implement the behaviors described herein with regard to OTN auto carving and policy enforcement. The DBs 212, 214, 216 may be stored in the memory 208 and/or the data store 206. The link DB 212 includes updated information related to each link in a network including. The topology DB 214 includes updated information related to the network topology, and the circuit DB 216 includes a listing of terminating circuits and transiting circuits at an NE where the CMs 200a, 200b are located. The CMs 200a, 200b may utilize control plane mechanisms to maintain the DBs 212, 214, 216. For example, HELLO messages can be used to discover and verify neighboring ports, nodes, protection bundles, boundary links, and the like. Also, the DBs 212, 214, 216 may share topology state messages to exchange information to maintain identical data. Collectively, the state machine 210 and the DBs 212, 214, 216 may be utilized to advertise topology information, capacity availability, and provide connection management (provisioning and restoration). For example, each link in a network may have various attributes associated with it such as, for example, line protection, available capacity, total capacity, administrative weight, protection bundle identification, delay, designation of boundary link, and the like. The state machine 210 and the DBs 212, 214, 216 may be configured to provide automated end-to-end provisioning. For example, a route for a connection may be computed from originating node to terminating node and optimized using Dijkstra's Algorithm, i.e. shortest path from source to a destination based on the least administrative cost or weight, subject to a set of user-defined constraints.

Further, the CMs 200a, 200b are configured to communicate to other CMs 200a, 200b in other nodes on the network. This communication may be either in-band or out-of-band. For SONET networks and similarly for SDH networks, the CMs 200a, 200b may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the present invention includes an in-band signaling mechanism utilizing OTN overhead. The General Communication Channels (GCC) defined by ITU-T Recommendation G.709 are in-band side channels used to carry transmission management and signaling information within Optical Transport Network elements. The GCC channels include GCC0 and GCC1/2. GCC0 are two bytes within Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within Optical Channel Data Unit-k (ODUk) overhead. In the present invention, GCC0, GCC1, GCC2 or GCC1+2 may be used for in-band signaling or routing to carry control plane traffic. Based on the intermediate equipment's termination layer, different bytes may be used to carry control plane traffic. If the ODU layer has faults, it has been ensured not to disrupt the GCC1 and GCC2 overhead bytes and thus achieving the proper delivery control plane packets.

Figure 3:
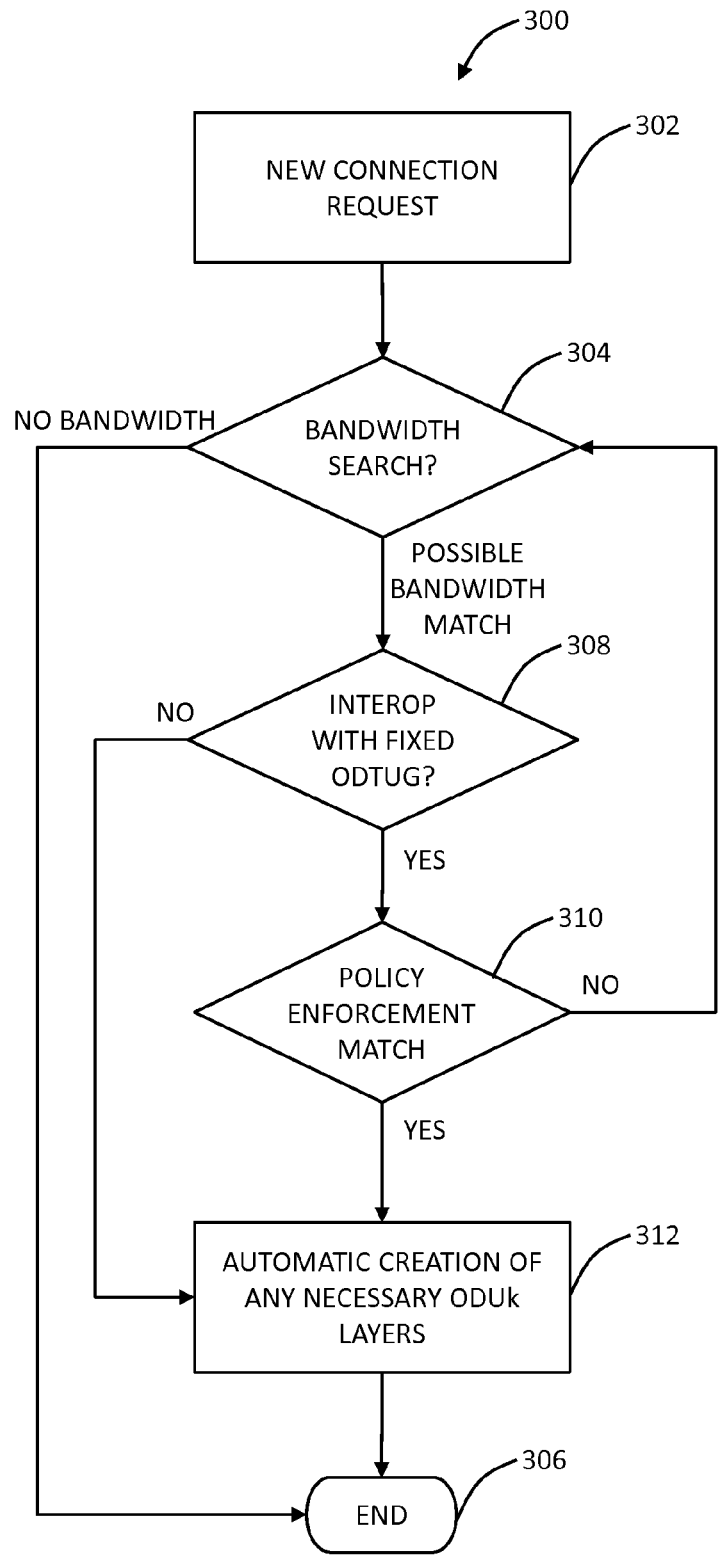
FIG. 3 is a flowchart of an operational method of automatic carving of ODUk levels on connection creation as well as the enforcement of an OTN hierarchy policy.

Referring to FIG. 3, in an exemplary embodiment, a flowchart illustrates an operational method 300 of automatic carving of ODUk levels on connection creation as well as the enforcement of an OTN hierarchy policy. In particular, the operational method 300 may be implemented through the optical network element 100 in a network, through the CMs 200, and the like. The operational method 300 is configured to allocate bandwidth for new connections in a network focusing on two objectives, locating available bandwidth quickly and minimizing bandwidth fragmentation. In particular, bandwidth fragmentation is minimized by allocating new connection bandwidth in the smallest possible ODU leaving larger chunks of bandwidth for larger connections to be provisioned in the future. The operational method 300 is initiated upon a new connection request (step 302). For example, the new connection request may include a Sub network Connection (SNC) of a defined OTN bandwidth (e.g., ODU0, ODU1, ODU2, ODU2e, ODUflex, etc.) between certain network elements. The operational method 300 performs a bandwidth search (step 304). This may be performed locally at the network element as well as in conjunction with other network elements via a control plane. For example, the network element may determine if there is available bandwidth locally, and signal via the control plane other network elements for path creation and bandwidth allocation. For the bandwidth search, the operational method 300 performs an ODUk layer analysis to find the best method of automatically carving ODTUG structures down to the desired ODUk layer during end-to-end circuit setup. In particular, the operational method 300 may utilize a recursively descending algorithm (described in FIG. 4), an iterative array algorithm (described in FIG. 5), and an ordered linked list algorithm (described in FIG. 6).

Figure 4:
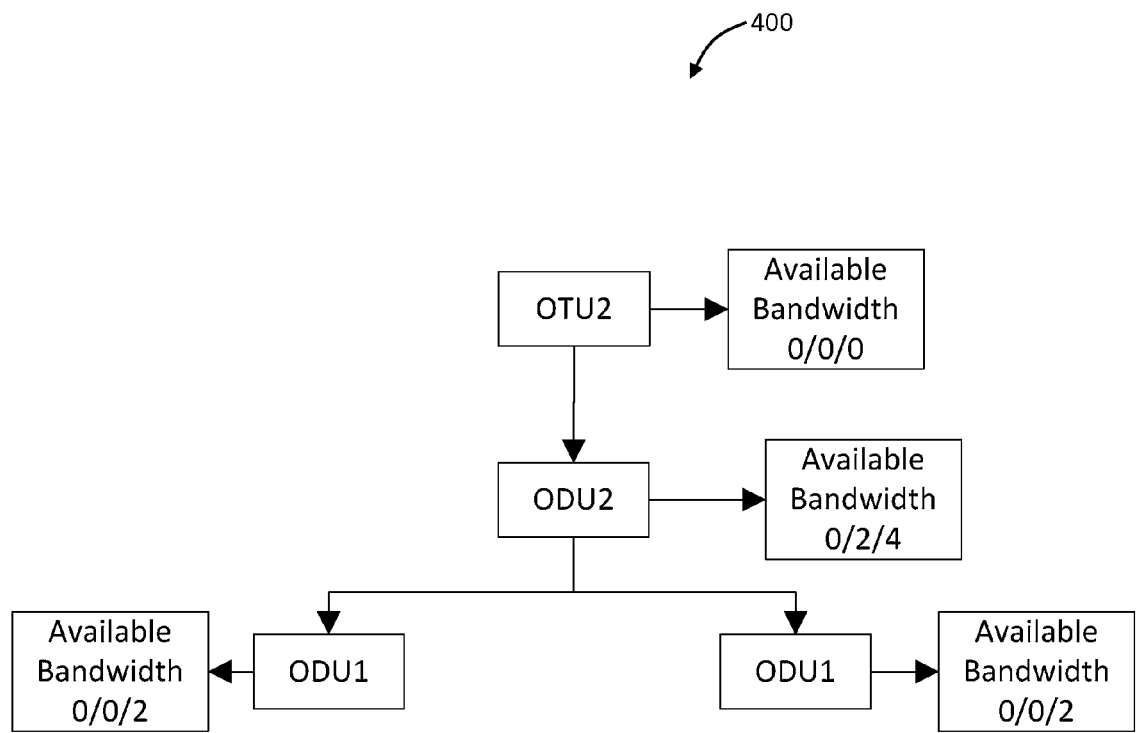
FIG. 4 is an exemplary parent/child relationship tree used in a recursively descending algorithm for maintaining a parent/child relationship of the OTU and ODUs in an exemplary embodiment of the operational method of FIG. 3.

Referring to FIG. 4, in an exemplary embodiment, the recursively descending algorithm maintains a parent/child relationship of the OTU and ODUs. That is, the recursively descending algorithm maintains a parent/child relationship tree starting with the OTU and continuing through each ODUk layer for each OTU at a network element, on a port, etc. The parent/child relationship tree is a data structure that may be stored and managed on the optical network element 100, on the CM 200, etc. Each parent starting from the OTU contains a data structure for its bandwidth and a list of pointers to child ODUs. For example, FIG. 4 illustrates an exemplary data structure 400 for an OTU2. Here, the parent is the OTU2 with pointers to an ODU2, ODU1s, etc. In the recursively descending algorithm, locating bandwidth is a recursive process of descending through the tree hierarchy. As appropriate bandwidth is found and returned, each return compares with the parent bandwidth for best match to reduce bandwidth fragmentation. For advertising bandwidth, the recursively descending algorithm recurses through the entire tree and keeping a running maximum of available bandwidth structure values. In the exemplary data structure 400, the parent OTU2 has no available bandwidth, i.e. 0/0/0 which is ODU2/ODU1/ODU0, the child ODU2 has 2 ODU1s and 4 ODU0s, i.e. 0/2/4 (ODU2/ODU1/ODU0), and the children ODU1 each have 2 ODU0s, i.e. 0/0/2 (ODU2/ODU1/ODU0). During circuit provisioning each node on the tree representing an ODUk layer is analyzed for bandwidth availability and ODTUG structure. As the recursive search locates and returns ODUk layers which fit the requirements, the nodes can be compared for best match. When the best match ODUk layer is located the network element 100, the CM 200, etc. can then automatically carve out the circuit by provisioning any lower ODUk layers necessary as specified by the ODTUG structure policy. The recursively descending algorithm has the benefit of being stored logically identical to the provisioned ODUk levels with the OTU.

Referring to FIG. 5, in an exemplary embodiment, the iterative array algorithm stores an array of each ODUk level at the smallest granularity of ODU0. In particular, the iterative array algorithm maintains an array at the granularity of the smallest connection, in this case ODU0, with a size representing each timeslot of granularity in the OTU. The array may be stored and managed in the network element 100, the CM 200, etc. In the example of FIG. 5, an array 500 is illustrated. At each child level of ODU, the array 500 can contain either an identifier for the ODU level which is provisioned in that timeslot or an "empty" value. The ODU identifier is stored in each array index owned by that ODU. Updating an index will recomputed the maximum provisionable ODU at that index, representing the largest ODU size that can be created in the parent ODU of that timeslot. Available bandwidth at each index is stored as well. Locating the available bandwidth requires a single pass of the maximum provisionable array. The first index in which the connection can be provisioned is kept as the current match and for each index in which the connection can be provisioned a comparison of best match is run to determine minimum bandwidth fragmentation. After the array is traversed, the current best match is returned. Advertising bandwidth requires iterating through the available bandwidth array and keeping a running maximum of available bandwidth structure values. When a new ODUk layer is provisioned each ODU0 segment owned by that ODUk layer is marked as such in the array, thus representing the parent ODUk. An additional array of ODU0 granularity stores the available bandwidth that can be provisioned within its parent. During circuit provisioning the array is traversed a single time. If the index shows that the circuit is smaller or equal to the available bandwidth the ODUk parent is chosen as best match. Each index is the array that contains available bandwidth is compared for best match as the array is traversed, resulting in the best match ODUk layer being returned. Again, if necessary the software will carve out any lower ODUk layers described in the ODTUG structure policy. This algorithm has the benefit of a one pass search to locate the best fit ODUk layer and an instant insertion of new ODUk layers by ODU0 granularity indexing.

Figure 6:
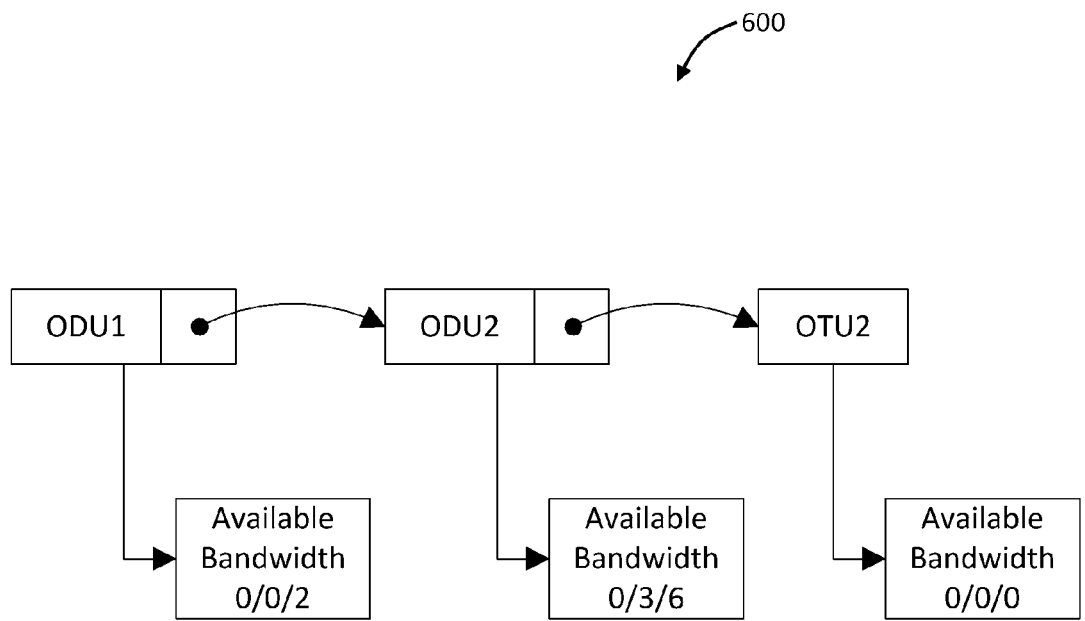
FIG. 6 is an exemplary linked list in which each element represents a single ODUk provisioned underneath the OTU for an ordered linked list algorithm used in an exemplary embodiment of the operational method of FIG. 3.

Referring to FIG. 6, in an exemplary embodiment, the ordered linked list algorithm includes a linked list in which each element represents a single ODUk provisioned underneath the OTU. The ordered linked list algorithm maintains a linked list in which each node represents an ODUk belonging to the OTU. The linked list may be stored and managed in the network element 100, the CM 200, etc. The ODUk stores its available bandwidth and ODTUG structure within list elements of the linked list. The linked list is sorted in ascending order from least bandwidth to most bandwidth. ODUk layers without available bandwidth do not need to be stored by the linked list. Each time a new ODU is created, a new node (i.e., link element) is added to the linked list and the linked list is resorted. Each list element keeps a data structure of the bandwidth available within the ODU represented below as ODU2/ODU1/ODU0. In the example of FIG. 6, a linked list 600 is illustrated for an OTU2 with 0/0/0 (ODU2/ODU1/ODU0) bandwidth at the OTU2, 0/3/6 (ODU2/ODU1/ODU0) bandwidth at an ODU2, and 0/0/2 (ODU2/ODU1/ODU0) bandwidth at an ODU1. Sorting the linked list may be done from least bandwidth available to most. Locating available bandwidth is as simple as traversing the linked list from head and returning when an ODU is found that contains enough bandwidth for the connection. Bandwidth fragmentation is minimized through sorting. Because the ODU with the least bandwidth that can still accept the connection is returned, larger chunks of bandwidth are not broken up by smaller connections. Advertising bandwidth requires iterating through the entirety of the linked list and keeping a running maximum of available bandwidth structure values. On a provisioning of ODUk layer, a new list element is inserted in the ordered linked list. Any ODUk layer which has a bandwidth change must also be located in the list and resorted. During circuit provisioning the linked list is searched from the head for available bandwidth. Because the linked list is already sorted best match for bandwidth fragmentation is already in order and the search can return the first ODUk which contains the necessary bandwidth and ODTUG structure, the main benefit of this algorithm.

Referring back to FIG. 3, the operational method 300 receives from one of the descending algorithm (described in FIG. 4), the iterative array algorithm (described in FIG. 5), or the ordered linked list algorithm an ODUk for the new connection request. If there is no bandwidth available, then the operational method 300 ends (step 306). Additionally, if required to interoperate with network elements which may have a fixed ODTUG structure within an OTU (step 306), a method of policy enforcement describing each ODUk layer mapped into ODTUG structures is used to detect if the ODUk provided from the bandwidth search is a best match, e.g. meets policy guidelines (step 310). The best match selection of the ODUk layer is the one with the smallest available bandwidth that will fit the new connection request being provisioned while at the same time matching the ODTUG structure policy. If the best match ODUk layer selected is not the lowest ODUk layer specified by the ODTUG structure but can support it, the software can automatically provision the lower ODUk layers as specified by the ODTUG structure policy. The selection of the smallest available bandwidth supporting the circuit being provisioned maintains optimal bandwidth fragmentation. In an exemplary embodiment, the method of policy enforcement may be implemented concurrently with the bandwidth search of step 304. For example, the policy information may be stored in the parent/child relationship tree, the array, or the linked list. In another exemplary embodiment, the method of policy enforcement may be implemented may be implemented separately.

Figure 7:
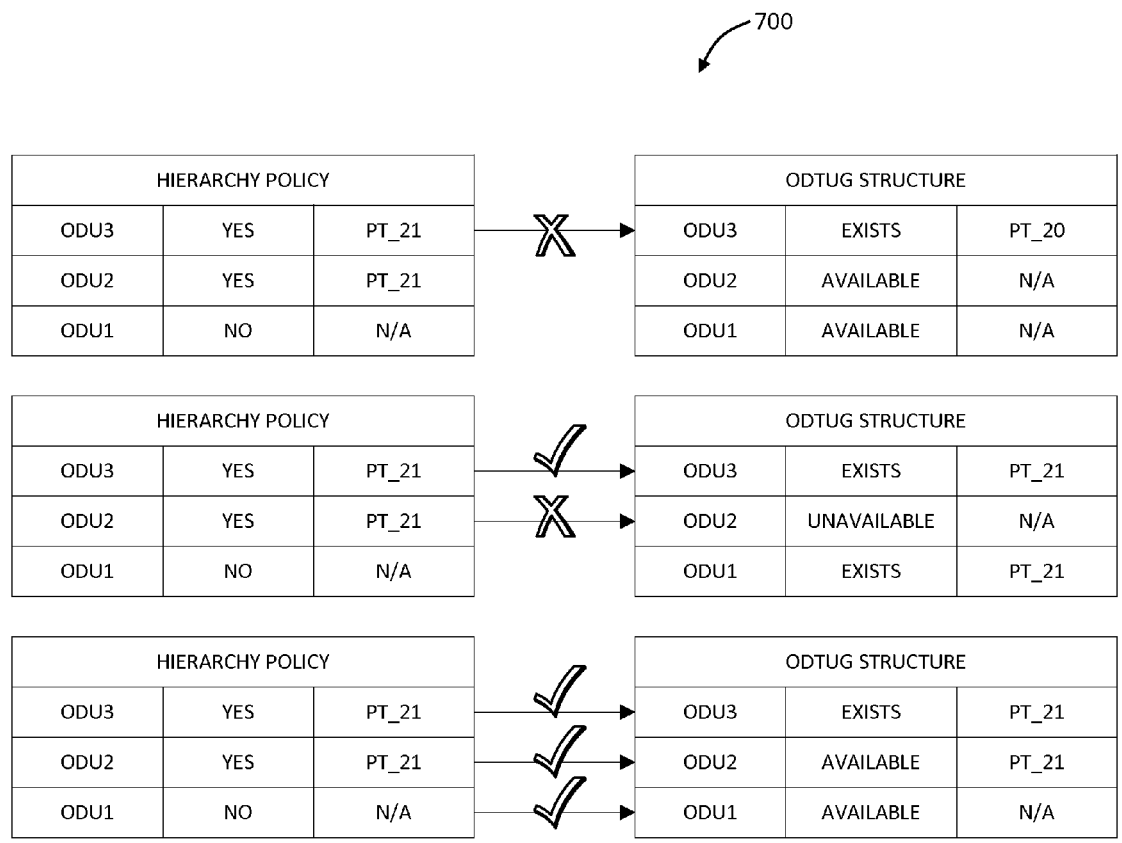
FIG. 7 is an exemplary OTN hierarchy policy applied to exemplary ODTUG structures illustrating implementation of a policy algorithm used in an exemplary embodiment of the operational method of FIG. 3.

OTN hierarchy can be enforced by the implementation of the policy algorithm. Each ODUk level which already exists can store its current hierarchy within the OTU, e.g. in the tree, the array, or the linked list. Policy for a new connection can be set in several ways. A policy can be set on a node wide basis so that any new connection created on any port of the node will adhere to the policy. A policy can be set on a port wide basis so that any connection originating or terminating on that port will adhere to the policy. A policy can be set on a connection basis so that the policy will be enforced at any port on which that connection is provisioned. Specifically, the policy is set on potential connections that require adherence to the fixed ODTUG structure for interoperability. In an exemplary embodiment, the policy structure contains a row for each ODUk level, a requirement of whether that level must exist and the payload type required at that level. For example, FIG. 7 illustrates an exemplary hierarchy policy 700 for an ODU3 compared to actually provisioned ODTUG structures. Any value can be marked as N/A or the like if not required to be enforced. The ODTUG structure for existing ODUk levels contains a row for each level, whether that level currently exists, is unavailable to be provisioned, or unavailable, and the payload type if that level exists. For example, the payload types may include PT=20 (ODU multiplex structure) or PT=21 (OPU2, OPU3 1.25 Gbit/s tributary slot multiplex structure). Policy matching is rejected if a level exists that the policy specifically excludes, if a level required is unavailable or if there is a payload type mismatch.

The ODTUG structure that matching is performed against is stored in the same way as the available bandwidth in the bandwidth search of step 304. The policy match may be checked at the same time as best match for bandwidth fragmentation and policy match failures are not considered for best match (i.e., during the step 304). If the bandwidth search in step 304 is performed prior to the policy enforcement step 310, the policy enforcement step 310 ensures any selected ODUk matches the OTN hierarchy policy, and if not, returns the operation method 300 to the step 304 to search again for an ODUk. Finally, the operational method 300 provides an ODUk and ODTUG structure for the new connection with the automatic creation of any necessary ODUk layers (step 312).

Advantageously, the present invention enables end customers flexible bandwidth usage. The customers may change their bandwidth usage in no time such as through point-and-click provisioning without affecting and/or pre-announcing their end users at any time of the day or night. Also, the present invention allows SNCs to mesh at much faster rates compared to manual intervention and meshing. Most end customers require end-to-end OTN circuit provisioning at any ODU level from ODU0 to ODU3/4 and they want the bandwidth to be auto carved and more often to interoperate with some other vendor with a specific auto carve scheme on different ports. The present invention enables an efficient method to implement such auto carving and policy enforcements.

In an exemplary implementation, provisioning an ODU0 Connection Termination Point (CTP) with a policy of 3→2→0 will be examined in several different scenarios. The policy represented is one which requires the ODU0 to be created inside an ODU2 which is inside an ODU3. In a first exemplary implementation, the simplest scenario is an empty OTU. Since nothing is currently provisioned, the operational method 300 will locate available bandwidth and policy match without issues. A request is received (e.g., via the control plane), the operational method 300 will return the first timeslot belonging to the OTU. First timeslot can actually be the last timeslot if high order allocation is used. The operational method 300 will carve out new Transmit Logical Port IDs (TLPIs) for ODU3 and ODU2 per the hierarchy policy. In another exemplary implementation, creation of a connection on an OTU containing connections requires can be more involved since the operational method 300 must compare each possible match for best fit to minimize bandwidth fragmentation and for OTN hierarchy policy matching. Here, the request is received (e.g., via the control plane), the operational method 300 iterates through each timeslot (using one of the algorithms in FIGS. 4-6). Any timeslot which has a match for CTP availability is compared against the OTN hierarchy policy and then against the current best match. If the current best match is a higher ODUk level it is replaced by the lower ODUk level to provide minimum bandwidth fragmentation. In another exemplary implementation, it is possible for bandwidth to be available but unusable because of a policy mismatch. For example, if an ODU3 TTP is filled with all ODU1 TTPs that have ODU0 bandwidth available, it appears an ODU0 SNC can be created. However because the ODU0 SNC has a policy of 3→2→0 bandwidth allocation will fail.

In an exemplary embodiment, the operational method 300 may be implemented using the iterative array algorithm. The iterative array algorithm does not require a recursive search to locate bandwidth, or a deep dive search which must analyze every ODU created at every level. The iterative array algorithm does not require memory allocation during provisioning by using direct index access and use of identifiers and enums (enumerated types). The auto carve ability in conjunction with the hierarchy policy provides the best interoperability with other vendors' equipment, and supports both payload type 20 and 21 in the same generic data structure. Also, the iterative array algorithm provides a single pass for locating or advertising bandwidth and direct index access for provision of new ODUk levels or connections faster than any other currently developed algorithm providing the same functionality.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A method, comprising:
receiving a connection request for Optical Transport Network (OTN) bandwidth at a network element;
iteratively utilizing a data structure stored in a data store to automatically carve a smallest available bandwidth in terms of Optical channel Data Tributary Unit Group (ODTUG) structures down to a desired Optical channel Data Unit level k (ODUk) for the connection request while matching an ODTUG structure policy thereby minimizing bandwidth fragmentation; and
enforcing an OTN hierarchy policy on the connection request to select the smallest available bandwidth;
wherein the data structure comprises a parent/child relationship tree starting with an Optical channel Transport Unit (OTU) and continuing through each Optical channel Data Unit level k (ODUk) layer for each OTU at the network element.

2. The method of claim 1, further comprising:
implementing a recursively descending algorithm on the parent/child relationship tree to automatically carve the smallest available bandwidth.

3. The method of claim 1, wherein the data structure comprises an array of each ODUk level at the smallest granularity of Optical channel Data Unit level 0 (ODU0).

4. The method of claim 3, further comprising:
iterating through the array to automatically carve the smallest available bandwidth.

5. The method of claim 1, wherein the data structure comprises a linked list in which each element in the linked list represents a single ODUk provisioned underneath an OTU.

6. The method of claim 5, further comprising:
traversing the linked list to automatically carve the smallest available bandwidth.

7. The method of claim 1, further comprising:
utilizing the data structure to advertise available bandwidth via a control plane.

8. The method of claim 1, further comprising:
updating the data structure based on bandwidth changes at the network element.

9. The method of claim 1, wherein the OTN hierarchy policy enforces a fixed Optical channel Data Tributary Unit Group (ODTUG) structure.

10. An optical network element, comprising:
a plurality of ports configured to switch therebetween using an Optical Transport Network (OTN) hierarchy;
a data store configured to store data defining bandwidth and policy for each of the plurality of ports; and
a processor communicatively coupled to the data store and configured to automatically carve bandwidth in terms of Optical channel Data Tributary Unit Group (ODTUG) structures down to a desired Optical channel Data Unit level k (ODUk) for a connection request while matching an ODTUG structure policy based on an iterative analysis of the data thereby minimizing bandwidth fragmentation;
wherein an OTN hierarchy policy is enforced on the connection request to select a smallest available bandwidth; and
wherein the data comprises a parent/child relationship tree starting with an Optical channel Transport Unit (OTU) and continuing through each Optical channel Data Unit level k (ODUk) layer for each OTU at the network element.

11. The optical network element of claim 10, wherein the processor is configured to:
implement a recursively descending algorithm on the parent/child relationship tree to automatically carve the smallest available bandwidth supportive of the policy.

12. The optical network element of claim 10, wherein the data comprises an array of each ODUk level at the smallest granularity of Optical channel Data Unit level 0 (ODU0).

13. The optical network element of claim 12, wherein the processor is configured to:
iterate through the array to automatically carve the smallest available bandwidth supportive of the policy.

14. The optical network element of claim 10, wherein the data comprises a linked list in which each element in the linked list represents a single ODUk provisioned underneath an OTU.

15. The optical network element of claim 14, wherein the processor is configured to:
  traverse the linked list to automatically carve the smallest available bandwidth.

16. A control module, comprising:
  an interface communicatively coupled to a plurality of ports using an Optical Transport Network (OTN) hierarchy;
  a data store communicatively coupled to the interface; and
  circuitry communicatively coupled to the data store and the interface, wherein the circuitry is configured to:
  implement a control plane; and
  upon request for a new connection, automatically carve a connection in terms of Optical channel Data Tributary Unit Group (ODTUG) structures down to a desired Optical channel Data Unit level k (ODUk) for the connection while matching an ODTUG structure policy based on a iteratively analyzing a data structure stored in the data store such that bandwidth fragmentation is minimized and the ODTUG structure policy is complied therewith;
  wherein an OTN hierarchy policy is enforced on the connection request to select a smallest available bandwidth; and
  wherein data comprises a parent/child relationship tree starting with an Optical channel Transport Unit (OTU) and continuing through each Optical channel Data Unit level k (ODUk) layer for each OTU at the network element.

17. The control module of claim 16, wherein the circuitry is configured to operate any of Automatically Switched Optical Network (ASON), Automatic Switched Transport Network (ASTN), Generalized Multiprotocol Label Switching (GMPLS), or Optical Signaling and Routing Protocol (OSRP).

* * * * *